United States Patent [19]

Carter

[11] 4,118,885
[45] Oct. 10, 1978

[54] ANIMAL TRAP HOLDER

[76] Inventor: Ray L. Carter, Star Rt. C Box 293, Palmer, Ak. 99645

[21] Appl. No.: 775,370

[22] Filed: Mar. 7, 1977

[51] Int. Cl.² ............................................ A01M 23/28
[52] U.S. Cl. ......................................................... 43/97
[58] Field of Search ....................... 43/96, 97; 242/85.1

[56] References Cited

U.S. PATENT DOCUMENTS

| 844,927 | 2/1907 | Finkbeiner | 43/96 |
| 959,659 | 5/1910 | Walter | 43/96 |
| 2,388,539 | 11/1945 | Hartman | 43/96 |
| 2,833,075 | 5/1958 | Herron | 242/85.1 X |
| 3,174,702 | 3/1965 | French | 242/85.1 |
| 3,411,234 | 11/1968 | Harrison | 43/97 |

FOREIGN PATENT DOCUMENTS 867,032  3/1971  Canada ......................................... 43/96

Primary Examiner—Clifford D. Crowder

[57] ABSTRACT

An attachable device for supporting an animal trap of the rotating jaw type. An elongated strap has a central raised member forming two slots with the strap for receiving the jaw members of the trap to support it.

1 Claim, 3 Drawing Figures

ANIMAL TRAP HOLDER

BACKGROUND OF THE INVENTION

At present, the before mentioned animal trap, specifically prior art U.S. Pat. No. 3,010,245; is a very effective and humane trap but is somewhat hard to set in certain places and conditions, such as, on frozen ground, under deep water, through a hole in the ice, and even under ordinary conditions it is very time consuming, in placing the trap in a desired place by means of stakes or propping it up with sticks or the likes as illustrated in FIG. 4 of the before mentioned prior art patent.

The present invention here in disclosed, is a simple device which greatly improves the efficiency of the said trap and makes it much faster and easier to set, stabalizes it from tipping over and makes it more adaptable to different situations such as, setting the trap under any depth of water from a boat or through a hole in the ice.

By means of wire hooks or telescoping tongs, it can be lowered to the bottom of the lake or stream such as in a beavers runway, which is quite often under many feet of water and will stay in an upright position until set off by the intended animal.

At present it is almost impossible to set the trap under very deep water and the jaws of the trap will often sink into the mud and delay the springing of the trap, where as the present invention disclosed can be so bent as to hold the trap in conjunction with the spring thereof, up, out of any reasonable amount of mud, and is also very effective above water where the trap can be quickly set in front of a den or in an animsls runway or trail and be so adjusted and also camouflaged as to be more selective in the different sizes and kinds of animals caught.

SUMMARY OF THE INVENTION

It is the principal object of this invention to provide a trap holder that will improve the efficiency of a prior art animal trap.

It is an other object of the invention to provide a trap holder that will stabalize the trap and keep it from tipping over easy.

It is still another object of the invention to provide an attachment for a prior art animal trap that will make it faster and easier to set.

It is yet another object of the invention to provide a trap holder that is simple in construction, easy to manufacture, and effective in its intended use.

These together with, other objects and advantages will become more apparent from the following detailed description, discussion and appended claims taken in conjunction with the accompaning drawings in which:

DESCRIPTION OF THE PREFERRED EMBODIMENTS

Figure 1:
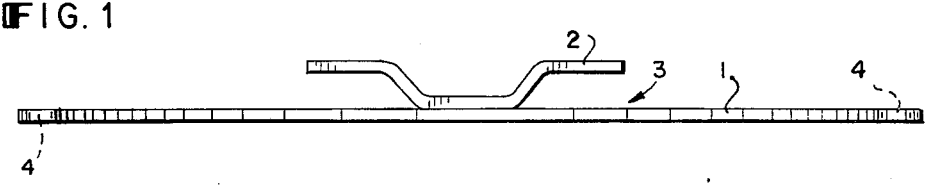
FIG. 1 is a side elevated view of the present invention.
Figure 2:
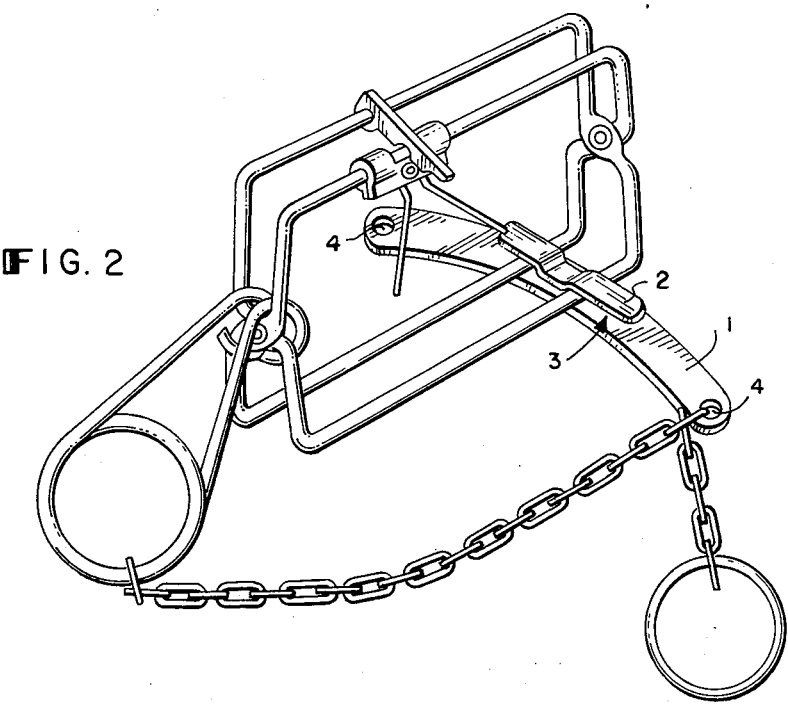
FIG. 2 is a perspective view of the invention attached to and installed in one application in conjunction with a prior art animal trap in a set position.
Figure 3:
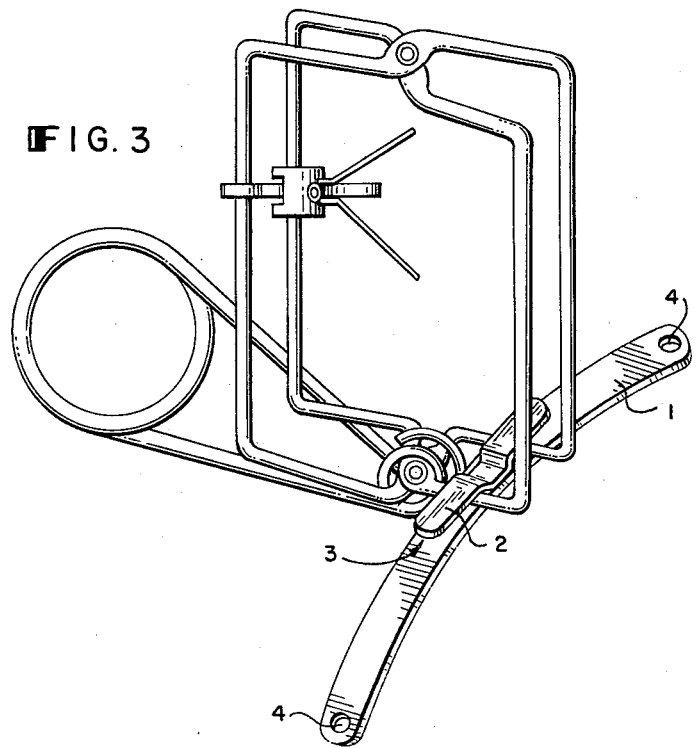
FIG. 3 is another perspective view of the invention applied in an alternate position in conjunction with the prior art animal trap in a set condition.

Referring now to FIG. 1, there is provided an elongated malable strap member 1 which includes a shorter strap member 2, so bent and welded or otherwise secured to said strap member 1 as to provide two parallel slots 3 between strap members 1 and 2 being open at each end to receive the jaw members of a prior art animal trap therein, said slots 3 being of sufficient width as to allow free movement of the trap jaw member within and out of said slots 3. Said slots 3 being only of sufficient lengths as to securely hold the jaw members of the prior art animal trap when in a set position. Said elongated strap member 1 also includes a plurality of holes or bores 4 through the ends thereof for different set applications and attachment to the chain of the trap.

The preferred material used for the device is a bendable strap metal, but not of necessity, as different materials may be used and prebent or shaped for different set and application but for all practical purposes, a bendable strap metal is here in implied, so that anyone skilled in the art may bend and apply the device to any of there particular needs, such as, bending it and nailing it to a tree or post next to an animal trail so that the trap may be placed at any height for different sizes and kinds of animals. Said holes 4 being provided for this purpose as well as for attachment to the chain of said trap.

In the application of the device, the trap is set in preparation with the safety catch in place. The trap holder is then placed parallel between the lower jaws of the trap and turned one quarter turn until the jaw members of the trap are engaged in the slots 3. The safety means of the trap may then be disconnected and the trap is ready to be set in the desired place. When the trap has been sprung, the jaw members of the trap will be forced out of the slots 3 and become free of the trap except where it is fastened to the chain of the trap to prevent loss thereof.

The foregoing is considered as illustrative only of the scope of the invention as claimed, the scope of which being indicated by the appended claims rather than the foregoing description and all changes which come within the meaning and range of equivalency of the claims, are therefore intended to be embraced therein.

what is claimed and desired to be secured by Letters Patent is;

1. An animal trap holder for a trap including plural jaw members and a securing chain comprising: an elongated strap member having at a central portion thereof a raised portion forming two shorter strap members in a plane parallel to the elongated strap member whereby two slots are formed between the elongated strap member and the shorter strap members, said slots being open at their ends to receive the jaw members of an animal trap therein, said elongated strap member also including a plurality of holes therein for application and attachment to the chain of said animal trap.

* * * * *